United States Patent [19]
Pfeifer et al.

[11] Patent Number: 5,551,331
[45] Date of Patent: Sep. 3, 1996

[54] ESPRESSO APPARATUS WITH IMPROVED HEATING OF THE BREW HEAD AND BOILER

[75] Inventors: Thomas J. Pfeifer, Louisville, Ky.; Ziv S. Rotlevi, Fresh Meadows, N.Y.

[73] Assignee: Grindmaster Corporation, Louisville, Ky.

[21] Appl. No.: 440,889

[22] Filed: May 15, 1995

[51] Int. Cl.⁶ .................................................. A47J 31/54
[52] U.S. Cl. ........................................... 99/280; 99/281
[58] Field of Search ........................... 99/280, 281, 282, 99/285, 283, 293, 295, 279, 302 R, 300, 307, 288

[56] References Cited

U.S. PATENT DOCUMENTS

| | | |
|---|---|---|
| 830,771 | 9/1906 | Dowe . |
| 2,868,178 | 1/1959 | Peters .......................................... 99/281 |
| 3,353,474 | 11/1967 | MacCorkel ................................ 99/295 |
| 3,423,209 | 1/1969 | Weber . |
| 3,795,788 | 3/1974 | Perucca ...................................... 99/281 |
| 4,137,833 | 2/1979 | Yelloz ........................................ 99/293 |
| 4,278,013 | 7/1981 | Noren et al. . |
| 4,480,173 | 10/1984 | Butterfield ................................ 99/281 |
| 4,565,121 | 1/1986 | Ohya et al. . |
| 4,583,449 | 4/1986 | Dangel et al. ............................ 99/279 |
| 4,599,937 | 7/1986 | Ghione ...................................... 99/293 |
| 4,613,745 | 9/1986 | Marotta et al. ........................... 99/282 |
| 4,641,012 | 2/1987 | Roberts ..................................... 99/281 |
| 5,014,611 | 5/1991 | Illy et al. .................................. 99/280 |
| 5,115,730 | 5/1992 | Gockelmann ............................. 99/293 |
| 5,186,096 | 2/1993 | Willi . |
| 5,259,279 | 9/1993 | Giuliano ................................... 99/291 |
| 5,302,407 | 4/1994 | Vetterli . |
| 5,372,061 | 12/1994 | Albert et al. ............................. 99/293 |

FOREIGN PATENT DOCUMENTS

| | | | |
|---|---|---|---|
| 34127 | 8/1981 | European Pat. Off. ................. 99/279 |
| 2425219 | 1/1990 | France ..................................... 99/281 |
| 194097 | 12/1957 | Germany ................................. 99/287 |
| 925778 | 5/1963 | United Kingdom .................... 99/283 |

*Primary Examiner*—Frankie L. Stinson
*Assistant Examiner*—Tony G. Soohoo
*Attorney, Agent, or Firm*—Wheat, Camoriano, Smith & Beres, PLC

[57] ABSTRACT

An espresso apparatus having a brew head which is in liquid communication with a heat exchanger that is positioned within a boiler and a secondary heater for supplng additional heat to the water in the boiler, the second heater being turned off when the pump supplying water to the heat exchanger is on. The brew head has a thermostat component and an electric heating element positioned about the brew head infusion chamber. The thermostat component is independent of the heater coil in the boiler, set at a predetermined temperature level, and is responsive to changes in the temperature of the brew head and appropriately opens or closes the circuit connected to the electric heating element.

11 Claims, 2 Drawing Sheets

ESPRESSO APPARATUS WITH IMPROVED HEATING OF THE BREW HEAD AND BOILER

BACKGROUND OF THE INVENTION

The present invention relates to a coffee brewing apparatus and more specifically to an apparatus for the preparation of coffee based beverages such as espresso and capuccino.

A typical espresso apparatus includes components both for the brewing of espresso coffee and the heating/frothing of a volume of milk. In the brewing process, hot water is forced through the fine coffee powder at a pressure and temperature predetermined to provide the most suitable taste to the resulting coffee beverage. The process of forcing the water through the coffee powder pressed between perforated disks in the brew head of the espresso apparatus is called infusion. The temperature of the water is typically controlled by the amount of heat the water absorbs while flowing through a heat exchanger positioned within the boiler of the espresso apparatus. It is clearly desirable that the water under pressure be at a temperature which is most efficient for the infusion process.

It is difficult to ensure that the water reaching the brew head is at the precise desired temperature needed for quality infusion due to temperature drop after leaving the heat exchanger. The brew head acts as a heat sink causing much of the temperature drop. Typical prior art attempts to control the temperature of the brew head in an espresso apparatus use a pump to flow the water from the boiler through the brew head. However, such espresso devices suffer from slow response time and are cumbersome in design. Others attempt to raise the temperature of the water in the boiler to increase transfer of heat to the water flowing through the heat exchanger. This has not proven to be a satisfactory solution since the residual time of the water within the heat exchanger is not sufficient to effect the desired incremental change in heat transfer.

Espresso apparatus that also have components for heating/frothing milk generally employ a "steam wand" communicating with a steam zone in the same boiler that is immersed in a volume of milk in a container to raise the temperature of milk to acceptable levels and to provide the desired frothing. Cappucino beverages are ordinarily comprised of one third espresso, one third hot milk, and one third froth. When steam is used for the heating and/or frothing, there is a delay in recovery of the steam zone before the same cycle can again be initiated. The amount of heat input to a boiler heated by electricity is limited by the voltage and current rating of the electrical supply outlet into which the apparatus is plugged. Where 240 volt outlets are available, the delay generally is not a problem since the recovery time of the apparatus in producing steam is acceptable. However, it becomes a serious problem when locally available electric power comes from 120 volt circuits. Sacrifices must be made which typically means that insufficient steam may be available for the proper heating and frothing of milk. Discerning consumers of coffee based beverages, accustomed to the greater power available for such espresso devices where 240 volt outlets are available for brewing and frothing, can readily detect the difference when the milk is under heated or frothed.

OBJECTS AND SUMMARY OF THE INVENTION

It is an object of the present invention to provide for an espresso brewer that can control the temperature of the brew head, thus providing for more concise regulation of the temperature of the hot water used to infuse the powder coffee. Still another object of the present invention to provide for an espresso brewer that can control the temperature of the brew head independently of the temperature of the hot water in the boiler. It is still another object of the present invention to provide for an espresso brewer in which adequate power is supplied to boilers heated by electricity to provide both acceptable heating levels of espresso and heating/frothing of milk even where available electric circuit outlets supply less than 240 volts.

These and further objects of the present invention are provided by an espresso apparatus having a brew head which is in liquid communication with a heat exchanger that is positioned within a boiler and a secondary heater that is turned on when the pump supplying water to the heat exchanger is off. The brew head is coupled to a thermostat component and contains an internal positioned electric heating element coiled about the infusion chamber. The thermostat component is independent of the heater coil in the boiler, set at a predetermined temperature level, and is responsive to changes in the temperature of the brew head and appropriately opens or closes the circuit connected to the electric heating element.

BRIEF DESCRIPTION OF THE DRAWING

The drawing is set forth in several FIG. 1 illustrating an embodiment of the present invention in which.

DETAILED DESCRIPTION OF THE PREFERRED EMBODIMENT

Figure 1:
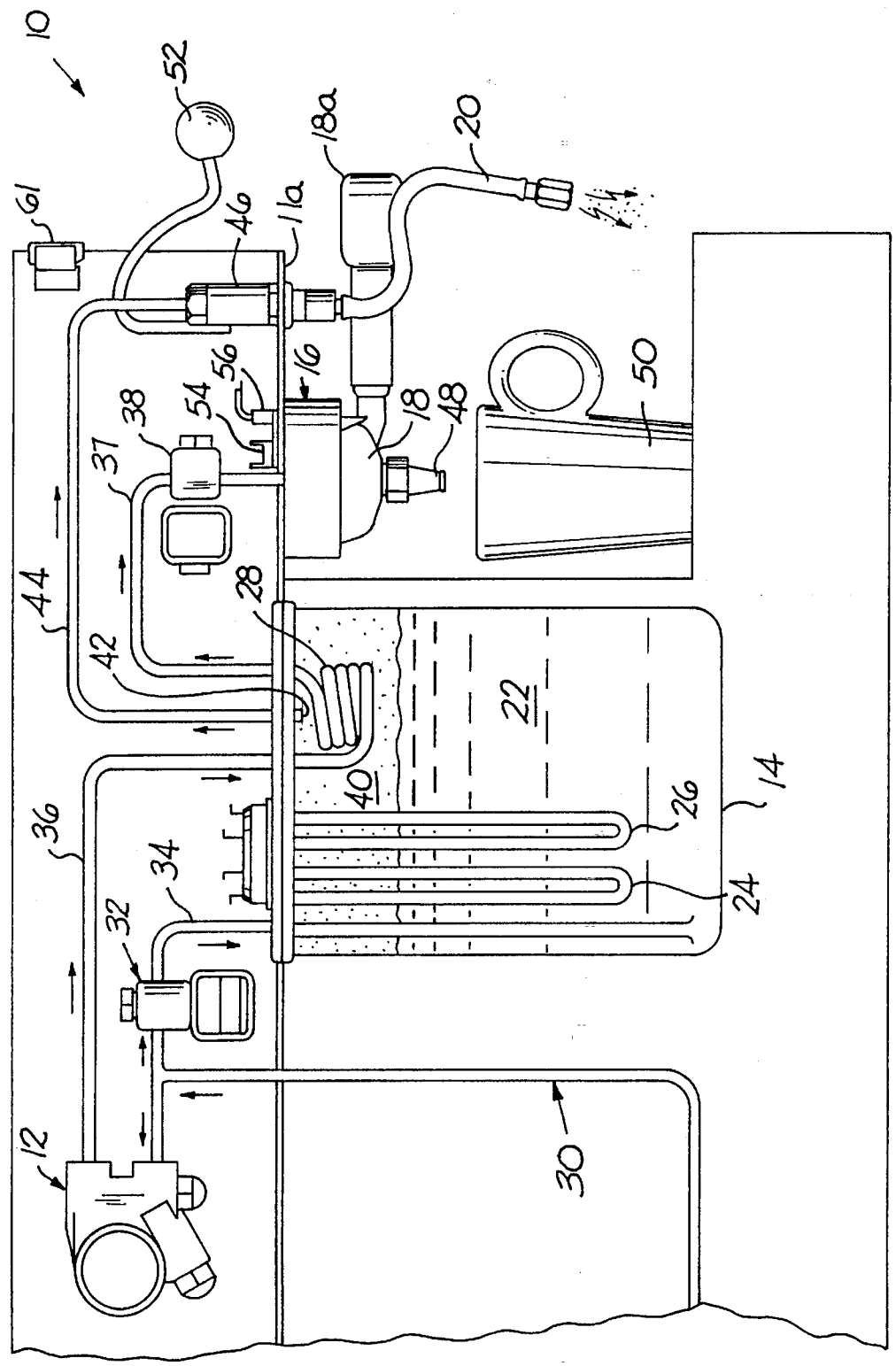
FIG. 1 is a side schematic view of an embodiment of an espresso apparatus in accordance with one embodiment of the present invention.

The schematic of FIG. 1 illustrates the various components of an espresso apparatus 10 for the preparation of espresso or cappucino beverage. The main parts or components of apparatus 10 are housing 11, pump 12 and boiler 14 within housing 11, a brew head 16, filter holder 18, and steam wand 20 attached to the underneath surface 11a of housing 11. Filter holder 18 is detachably engaged to and beneath brew head 16 in a gaseous tight relationship and can be detached in a known fashion through movement of handle 18a.

Boiler 14 serves as a reservoir for water 22 and also contains a pair of heating coils, main heating coil 24 and a secondary heating coil 26, and a heat exchanger 28. Boiler 14 receives water from an external source (not shown) through a line 30, valve 32, and inflow line 34. Control of the water level within boiler 14 may be accomplished through any of well known water sensing controls for beverage dispensers, but, since such sensing control forms no portion of the present invention, it is not shown. Water 22 is heated by coils 24 and 26 and forms a steam zone 40 above water 22 in boiler 14. For the purpose discussed below, coil 26 is not on line when pump 12 is activated.

Pump 12 supplies water from the outside source through line 36 directly to heat exchanger 28 then through line 37 to three-way valve 38 into brew head 16. Steam from steam zone 40 within boiler 14 is supplied to steam wand 20 through steam inlet 42 (positioned at the top of boiler 14) leading into a steam line 44 and then through an open ball valve 46. Heat exchanger 28 is positioned within the steam zone 40 and thus serves to heat water from pump 12 before it is delivered to brew head 16. Typical hot water temperatures acceptable for brewing espresso are between about 190° and 205° F. Desirable pressures provided by pump 12 are between about 120 and 130 psi. Thus, when valve 38 is open, the hot water pumped to heat exchanger 28 by pump 12 is able to move through brew head into filter holder 18 containing a coffee powder. The hot water infuses the powder and the resulting coffee beverage exits through nozzle 48 into a container 50. Similarly, when lever 52 is moved, ball valve is opened and steam is free to move from steam zone 40 through wand 20 into a container (not shown) positioned beneath wand 20 for heating or frothing of the liquid contained therein.

Figures 2, 3:
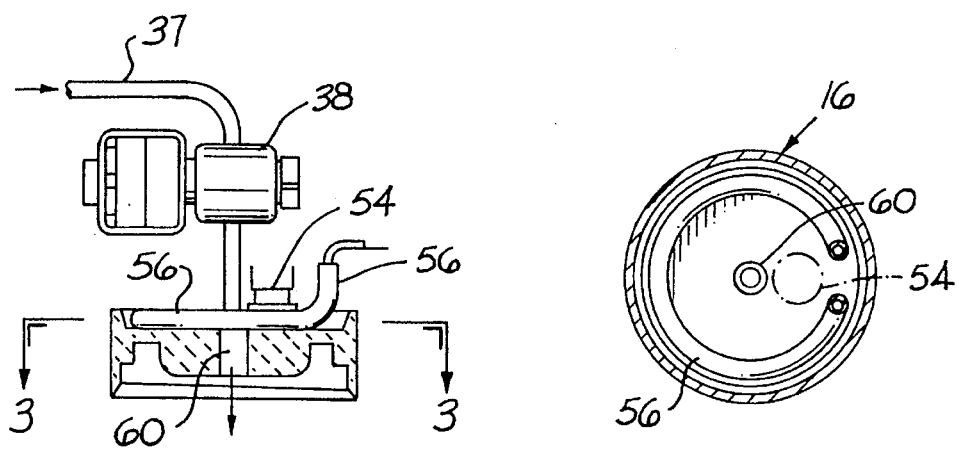
FIG. 2 is a sectional view of the brew head of the espresso apparatus showing the heater inside the brew head.
FIG. 3 is a sectional view taken along lines 3—3 of FIG. 2 showing the positioning of the heating coil in the brew head.

As illustrated in FIG. 2, brew head 16 is provided with a thermostat sensor 54 and an internal heating coil 56. In the sectional view of FIG. 3, it may be seen that coil 56 is preferably arranged within the brew head and circumferentially about the throat passageway 60 leading to the engagement area with the filter holder. Thermostat sensor 54 may be, for example, a preset control such as a model T500 thermostat available from Trig Thermostats while coil 56 may be a readily available calrod heating element. Alternatively, thermostat sensor could be a programmable sensor that can be preset for various temperatures. When sensor 54 senses the temperature of the surrounding brew head 16 is below a certain predetermined temperature, coil 56 is energized to return brew head 16 to the predetermined temperature.. Desirable temperatures within brew head 16 are between about 190° and 205° F. By so heating brew head, the hot water received from heat exchanger 28 is tempered to be within the acceptable temperature range.

Figure 4:
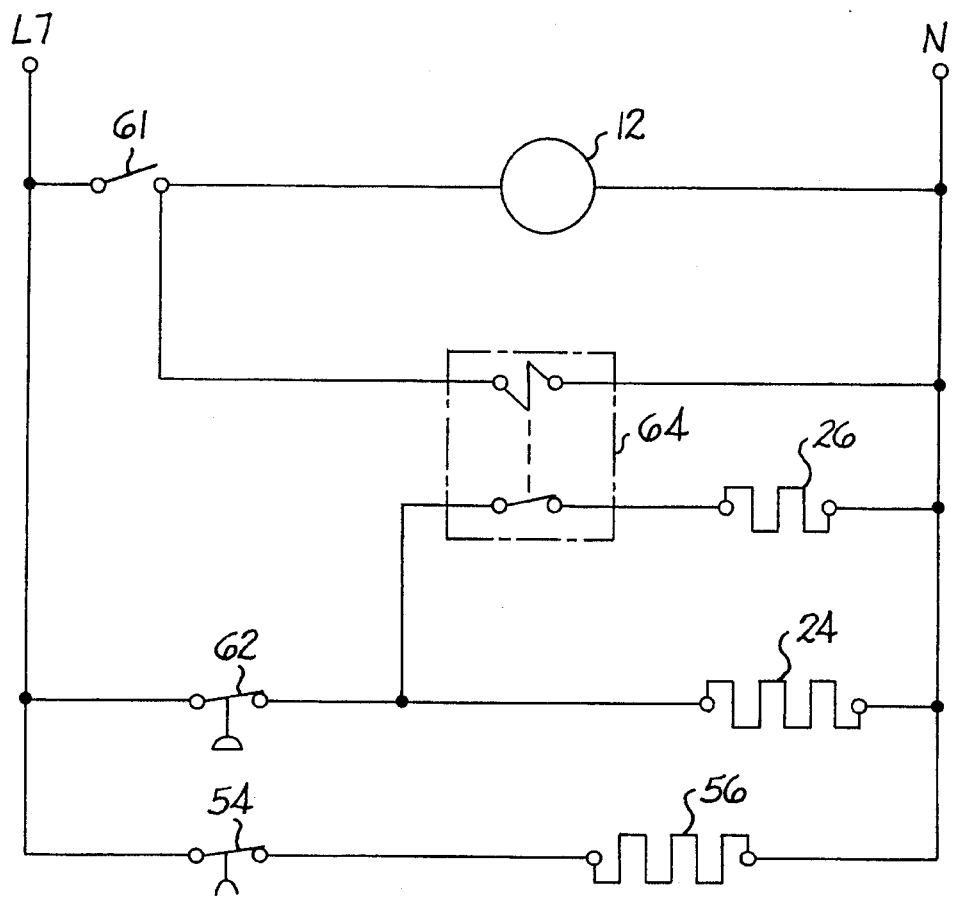
FIG. 4 is an electrical schematic of the brew head thermostat circuit.

Referring now to the electric schematic of FIG. 4, it may be seen that pump 12 is controlled by brewer off-on switch 61 mounted on the front of housing 11. When switch 61 is set to the on position pump 12 is activated and water flows to the brew head 16. The primary heater coil 26 is in parallel with pump 12 and is generally activated whenever power is supplied to apparatus 10. The heater coil circuit may be provided with a pressure sensitive switch 62 that opens automatically whenever the pressure in boiler 14 exceeds a predetermined level. Thermostat sensor 54 comprises a switch that is closed when the temperature within brew head 16 is below the predetermined level and open when the level is reached.

As stated above, it is desirable to have sufficient steam to both heat and froth the milk to acceptable standards. Often, however, due to electrical power limitations, a trade off is required, resulting in the sacrifice of steam pressure sufficient to heat and froth the milk to those acceptable levels. To solve this problem, the boiler of the present invention is provided with secondary heater coil 26 that is on except when pump 12 is activated. As seen in FIG. 4, the circuit of secondary heater 26 is provided with a relay switch 64 tied to the circuit of pump 12. Switch 64 is open when pump 12 is activated and closed when not.

In operation, valve 32 is opened, water enters boiler 14 and rises to a predetermined level, and valve 32 is closed. The apparatus 10 is plugged into a circuit outlet, energizing coils 24 and 26. Coffee powder is placed in filter holder 18 and holder 18 attached to brew head 16. After an appropriate time interval, permitting water in boiler 14 to reach a predetermined temperature level and steam to form in zone 40, switch 61 is moved to the brew-on position and pump 12 is activated. Simultaneously, relay 64 moves relay switch to an off position, taking heater coil 26 out of the circuit. Water is moved under pressure through heat exchanger 28 and through valve 38 into brew head 16. During this operation thermostatic sensor 54 senses the temperature of brew head and places coil either into or out of the circuit depending upon whether the temperature of head 16 is below or at a predetermined temperature. The hot water infuses through the cake of coffee powder and into cup or receptacle 50. Once brewing has been completed, switch 61 can be returned to its initial position to place heater 26 back into the circuit. Alternatively, switch 61 may be biased to automatically return to the non-brewing or off position after a predetermined time period has passed. Milk contained in a separate receptacle can be placed over and thus submerging the end of steam wand 20 and lever 52 manipulated to open valve 46 to permit steam to flow into the milk to heat and/or froth it.

From the ensuing description it is readily seen that the espresso apparatus of the present invention provides for a controlled and balanced heating of the brewer head that is independent of the heating of the water in the boiler. Additionally, the apparatus of the present invention provides for rapid recovery to acceptable levels of steam requirements between steam cycles even when using electrical circuit outlets of less than 240 volts.

We claim:

1. An espresso machine including a boiler connected to a water source for containing water, a first heating element within said boiler for heating the water to form steam in a steam zone above said water, a heat exchanger positioned within said steam zone of said boiler, a pump connected to the water source for supplying water under pressure to said heat exchanger, a brew head for receiving water from said heat exchanger, and means for heating said brew head while receiving water from said heat exchanger including a heating element mounted within said brew head and a thermostat sensing device mounted on said brew head for detecting when said brew head is below a predetermined temperature, said heating element in response to said thermostat sensing device heating said brew head when below said predetermined temperature.

2. The apparatus of claim 1 in which said heating element is a heating coil mounted within said brewer head.

3. The apparatus of claim 1 in which said apparatus includes a secondary heating means including a second heating element positioned in said boiler for heating said water, said secondary heating means in response to the activation of said pump deactivating said second heating element.

4. The apparatus of claim 3 in which said secondary heating means including a relay responsive to the activation of said pump for opening a switch in a circuit comprising said secondary heater.

5. An espresso apparatus including a boiler connected to a water source for containing water, a primary heating element within said boiler for heating the water to form steam in a steam zone above said water, a heat exchanger positioned within said steam zone of said boiler, a pump connected to the water source for supplying water under pressure to said heat exchanger, a brew head in liquid communication with said heat exchanger, a secondary heating element within said boiler, and means responsive to the activation of said pump for turning off said secondary heating element.

6. The apparatus of claim 5 in which said means includes a relay responsive to the activation of said pump for opening a switch in a circuit comprising said secondary heating element.

7. The apparatus of claim 5 including sensing means for sensing when the temperature in said brew head is below a predetermined level for heating said brew head.

8. The apparatus of claim 7 in which said sensing means includes a heating coil positioned in said head and a second switch in a circuit including said brew head, said switch being closed in response to said sensing means sensing a temperature below said predetermined level.

9. A brewing apparatus for the preparation of an espresso coffee beverage comprising (a) a boiler assembly having
 (i) a boiler container adapted to be partially filled with water received from a remote water source,
 (ii) a primary heating member positioned below the surface of the water in said boiler container for heating said water and forming a steam zone in said container above said water, said primary heating member connected to source of electric power, and
 (iii) a heat exchanger positioned in the steam zone;
 (iv) a secondary heating element positioned below the surface of the water in said boiler container, said secondary heating member removably connected to said source of electrical power;

(b) a brew head assembly having
 (i) a brew head member in liquid communication with said heat exchanger,
 (ii) a heating element positioned in said brew head member removably connected to the source of electric power,
 (iii) a temperature sensing element positioned adjacent to said brew head member for sensing the temperature of said brew head member and connecting said heating element to said source of electric power when the sensed temperature of said brew head member is below a predetermined temperature, and
 (iv) a coffee filter holder for containing coffee ingredients, said coffee filter holder removably mounted to said brew head member and in liquid communication with said heat exchanger through said first brew head member for providing a brewed coffee beverage;

(c) a pump in fluid communication with a remote water source and said heat exchanger, said pump being connected to said source of electrical power and a switch for selectively energizing said pump, said pump pumping water from said remote water source through said heat exchanger to said brew head assembly;

(d) a control element for disconnecting said secondary heating member from said source of electrical power when said pump is energized; and (e) a steam wand in communication with said steam zone for selectively providing a stream of steam to heat or froth a liquid to be used with the brewed coffee beverage.

10. The apparatus of claim 9 in which said brew head has a water channel therein and said heating element is a resistance coil mounted in close proximity to said water channel.

11. The apparatus of claim 9 including a relay switch in a circuit connecting said secondary heating element to the source of electrical power, said relay switch opening when said pump is energized.

* * * * *